United States Patent
Seames et al.

(10) Patent No.: US 9,206,367 B2
(45) Date of Patent: Dec. 8, 2015

(54) METHOD FOR COLD STABLE BIOJET FUEL

(75) Inventors: Wayne S. Seames, Grand Forks, ND (US); Ted Aulich, Grand Forks, ND (US)

(73) Assignee: University of North Dakota, Grand Forks, ND (US)

(*) Notice: Subject to any disclaimer, the term of this patent is extended or adjusted under 35 U.S.C. 154(b) by 41 days.

(21) Appl. No.: 11/824,644

(22) Filed: Jul. 2, 2007

(65) Prior Publication Data

US 2008/0092436 A1    Apr. 24, 2008

Related U.S. Application Data (60) Provisional application No. 60/806,305, filed on Jun. 30, 2006.

(51) Int. Cl.
*C10L 1/16* (2006.01)
*C10G 3/00* (2006.01)

(52) U.S. Cl.
CPC ............... *C10L 1/1616* (2013.01); *C10G 3/40* (2013.01); *C10G 3/45* (2013.01); *C10G 3/47* (2013.01); *C10G 3/49* (2013.01); *C10G 2300/1011* (2013.01); *C10G 2300/1014* (2013.01); *C10G 2300/1018* (2013.01); *C10G 2300/304* (2013.01); *C10G 2400/04* (2013.01); (Continued)

(58) Field of Classification Search
CPC ............... Y02E 50/13; Y02E 50/10; C10G 2300/1014; C10G 2300/1011; C10G 2300/304; C10G 2400/02; C10G 2400/04; C10G 2400/08; C10G 2/32; C10G 3/42
USPC ........................................................... 44/308
See application file for complete search history.

(56) References Cited

U.S. PATENT DOCUMENTS

| 4,364,745 A | 12/1982 | Weil |
| 4,992,605 A * | 2/1991 | Craig et al. ............ 585/240 |
| 5,233,109 A * | 8/1993 | Chow .................... 585/241 |

(Continued)

FOREIGN PATENT DOCUMENTS

| EP | 1396531 A2 | 3/2004 |
| JP | 59-062694 A | 4/1984 |

(Continued)

OTHER PUBLICATIONS

J.A. P. Coutinho, f. Mirante, J.C. Riberito. J.M. Sansot, J.I. Daridon, Cloud and pour points in fuel blends, 2002, Fuel 81, 963-967.*

(Continued)

*Primary Examiner* — Ellen McAvoy
*Assistant Examiner* — Ming Cheung Po
(74) *Attorney, Agent, or Firm* — Kinney & Lange, P.A.

(57) ABSTRACT

Plant or animal oils are processed to produce a fuel that operates at very cold temperatures and is suitable as an aviation turbine fuel, a diesel fuel, a fuel blendstock, or any fuel having a low cloud point, pour point or freeze point. The process is based on the cracking of plant or animal oils or their associated esters, known as biodiesel, to generate lighter chemical compounds that have substantially lower cloud, pour, and/or freeze points than the original oil or biodiesel. Cracked oil is processed using separation steps together with analysis to collect fractions with desired low temperature properties by removing undesirable compounds that do not possess the desired temperature properties.

32 Claims, 3 Drawing Sheets

(52) U.S. Cl.
CPC ............. *C10G2400/08* (2013.01); *Y02E 50/13* (2013.01); *Y02T 50/678* (2013.01)

(56) References Cited

U.S. PATENT DOCUMENTS

| | | | |
|---|---|---|---|
| 5,520,708 | A | 5/1996 | Johnson et al. |
| 5,578,090 | A | 11/1996 | Bradin |
| 5,705,722 | A | 1/1998 | Monnier et al. |
| 6,284,008 | B1 | 9/2001 | Caprotti |
| 7,014,668 | B2 | 3/2006 | Golubkov et al. |
| 7,041,738 | B2 | 5/2006 | Krull et al. |
| 7,045,100 | B2 | 5/2006 | Ergün et al. |
| 7,736,469 | B2 * | 6/2010 | Taylor .............................. 201/25 |
| 7,928,273 | B2 * | 4/2011 | Bradin ............................ 585/14 |
| 2003/0093942 | A1 | 5/2003 | Jordan |
| 2003/0100807 | A1 | 5/2003 | Shabtai et al. |
| 2003/0167681 | A1 | 9/2003 | Delgado Puche |
| 2004/0074760 | A1 * | 4/2004 | Portnoff ................. B01J 19/126 204/157.15 |
| 2004/0231236 | A1 * | 11/2004 | May et al. ........................ 44/401 |
| 2005/0232956 | A1 * | 10/2005 | Bist et al. ....................... 424/401 |
| 2006/0042158 | A1 * | 3/2006 | Lee .................................. 44/605 |
| 2006/0236598 | A1 | 10/2006 | Selvidge |
| 2007/0039240 | A1 | 2/2007 | Carroway |
| 2007/0068848 | A1 * | 3/2007 | Monnier et al. ................ 208/15 |
| 2007/0144060 | A1 | 6/2007 | Ikura |
| 2008/0071125 | A1 | 3/2008 | Li |

FOREIGN PATENT DOCUMENTS

| | | | |
|---|---|---|---|
| WO | 2008039756 | A2 | 4/2008 |
| WO | 2008103204 | A2 | 8/2008 |

OTHER PUBLICATIONS

R. O. Dunn, et al., "Low-Temperature Properties of Triglyceride-Based Diesel Fuels: Transesterified Methyl Esters and Petroleum Middle Distillate/Ester Blends", from JAOCS, vol. 72, No. 8, pp. 895-904 (1995).
I. Lee, et al., "Use of Branched-Chain Esters to Reduce the Crystallization Temperature of Biodiesel", from JAOCS, vol. 72, No. 10, pp. 1155-1160 (1995).
S. P.R. Katikaneni, et al., "Catalytic Conversion of Canola Oil to Fuels and Chemicals Over Various Cracking Catalysts", from The Canadian Journal of Chemical Engineering, vol. 73, pp. 484-497 (1995).
M. S. Graboski, et al., "Combustion of Fat and Vegetable Oil Derived Fuels in Diesel Engines," from Prog. Energy Combust. Sci., vol. 24, pp. 125-164 (1998).
F. Ma, et al., "Biodiesel Production: A Review", from Bioresource Technology 70, pp. 1-15 (1999).
R. O. Dunn, "Alternative Jet Fuels From Vegetable Oils", from American Society of Agricultural Engineers, vol. 44, pp. 1751-1757 (2001).
Y. S. Ooi, et al., "Catalytic Conversion of Palm Oil-Based Fatty Acid Mixture to Liquid Fuel", from Biomass and Bioenergy 27, pp. 477-484 (2004).
E. Corporan, et al., "Impacts of Biodiesel on Pollutant Emissions of a JP-8-Fueled Turbine Engine", from Journal of the Air & Waste Management Assoc., vol. 55, pp. 940-949 (Jul. 2005).
S. M. Sadrameli, et al., "Systematics of Renewable Olefins From Thermal Cracknig of Canola Oil," from J. Anal. Appl. Pyrolysis 78, pp. 445-451 (2007).
B.K. Bhaskara Rao, *Modern Petroleum Refining Processes*, Oxford & IBH Publishing Co. Pvt. Ltd. (5$^{th}$ Ed. 2007) pp. 304-407.
Schwab, A.W., et al. "Diesel Fuel from Thermal Decomposition of Soybean Oil" JAOCS, vol. 65, No. 11. Nov. 1988. pp. 1781-1786.
Luo, Yan, et al. "The thermal cracking of soybean/canola oils and their methyl esters" Fuel Processing Technology 91. 2010. pp. 613-617.
Graille, J., et al. "Production d'hydrocarbures par craquage catalytique des sous-produits de l'huilerie de palme I—Mise au point et essais preliminaries" Etudes et Recherches 3. 28 (10). Oct. 1981. pp. 421-426.
Stern, R., et al. "Les Huiles Vegetales et Leurs Derives Carburant De Substitution (Analyse Critique)" Revue De L'Institut Francais Du Petrole. vol. 38. No. 1. 1983. pp. 121-136.
The extended European Search Report in counterpart European Application No. 07873779.8 filed Jul. 2, 2007.
Daniela G. Lima et al., Diesel-like fuel obtained by pyrolysis of vegetable oils, Journal of Analytical and Applied Pyrolysis, Elsevier, Jun. 2004, vol. 71, No. 2, p. 987-996.
Nakamura & Partners, The Japanese Office Action mailed Aug. 7, 2014, 7 pages, Japanese Patent Appln. No. 2009-518333.
The Japanese Office Action mailed Oct. 29, 2013 for Japanese Patent Appln. No. 2009-518333.
PCT/US07/15349 International Search Report and Written Opinion, from the International Searching Authority, International filing date Jul. 2, 2007, Mailed Aug. 28, 2008, 8 pages.

* cited by examiner

METHOD FOR COLD STABLE BIOJET FUEL

REFERENCE TO COPENDING APPLICATION

This application claims priority from Provisional Application No. 60/806,305 filed Jun. 30, 2006, which is incorporated by reference.

STATEMENT OF GOVERNMENT INTEREST

This invention was made with government support under Grant No. DE-FC36-03GO13055 awarded by the United States Department of Energy. The government has certain rights in the invention.

BACKGROUND

One of the key challenges facing modern industrialized society is the limited sources of fossil fuel that are accelerating the development of renewable sources of fuel. Several new sources have been pioneered during the past 20 years, and one of the more attractive sources is fuel that is derived from biomass, referred to as biofuel. It has been speculated that up to 30 percent of current transportation fuel will be replaced by biofuel in the next 5 to 10 years. Although biofuel has been successfully introduced into the marketplace, certain properties of biofuel have restricted the use of larger quantities of biofuel for diverse transportation applications.

The most successful class of biofuels is biodiesel, which is produced from crop oils or animals fats. Unfortunately, biodiesel will not work as a diesel fossil fuel replacement for an aviation turbine due to limitations in its temperature dependent properties at the atmospheric temperatures experienced during flight. For example, military specifications require that aviation turbine fuel be completely resistant to the formation of solid crystals at temperatures as low as −47° C., which corresponds to an altitude of 9500 meters or about 31,000 feet. Unacceptably, canola methyl ester ("CME") and soy methyl ester ("SME") biodiesel have typical cloud points of 1.0° C. and 3.0° C., respectively and pour points of −9.0° C. and −3.0° C., respectively (Graboski, M. et al., Prog. Energy Combust. Sci, 24, 1998, 125-164). Similarly, biodiesel will not work as a fossil fuel replacement for diesel engines in cold temperatures. The chemical properties of biofuels currently in the marketplace are such that solids form in the fuel solution at cold temperatures, referred to "clouding" zones. Fuel clouding can cause fuel filters, carburetors or any small orifices to become clogged resulting in significant damage and repair expense and possibly resulting in death of the operator and passengers.

Three general classes of strategies have been investigated to overcome these cold flow limitations. These involve one or more methods to "winterize" the fuel by physical removal of the chemical components that solidify above the target freeze point, use of additives to inhibit solidification, or chemical manipulation of the fuel composition to modify the properties of the fuel.

One type of winterization process for biodiesel fuel involves first chilling or partially distilling the fuels followed by chilling and subsequently filtering out any precipitated solids (U.S. Patent Publication No. 2004/0231236). In this method, high melting point components of biodiesel are removed to decrease the fuel's freezing point, making it comparable to petroleum-based diesel fuels. This technique typically requires refrigeration of the biodiesel over lengthy time periods, e.g. 16 hours or longer, at the target cold flow temperature, followed by filtration of the solid crystals. The removal of partially solidified triglycerides reduces the cloud point and pour point of the biodiesel; however, the composition does not conform to the desired standards. Further, this method is time consuming and commercially expensive.

In yet another winterization approach, the biodiesel is subjected to a series of fractionation processes where material of lower volatility is separated out of the fuel. Lower volatility material tends to have a higher freezing point. By removing this material, the cold flow properties of the biofuel are enhanced. This method yields a pour point between −15° C. and −24° C. However, this temperature range is above the range required for aviation fuel or for a diesel fuel for very cold regions. This winterization method gives very low yields (<30% by weight), decreased cetane numbers (a measure of the quality of a fuel for diesel and turbine engines), and reductions in resistance to oxidation causing loss in combustion quality that may lead to engine durability problems as well as an increase in harmful exhaust emissions (Dunn, R. et al., "Low Temperature Properties of Triglyceride based Diesel Fuels", J. American Oil Chemists Soc, 72, 1995).

The second general class of methods to improve the cold flow characteristics of crop oil-based fuels is the addition of compounds that act to improve cold flow properties. Commercial additives developed for improving cold flow of conventional turbine and diesel fuels are largely ineffective for biodiesel. These are chemicals added in very small quantities (0.1-0.2% by volume) that can lower the cloud point. Typically they do so primarily by bonding to frozen molecules when the fuel falls below the cloud point, thus preventing those molecules from bonding/cross linking with other frozen molecules. Therefore, the additives are beneficial with respect to inhibiting nucleation and crystalline growth of biodiesel molecules. In general, the properties of these additives are inadequate because they primarily affect the pour point rather than the cloud point or have a minimal impact on cloud point. The cloud point is recognized to be a more critical property than the pour point for improving low-temperature flow properties because it is a low-temperature operability indicator (Dunn, R. O. "Alternative Jet Fuels From Vegetable Oils", American Society of Agricultural Engineers, Vol. 44(6), 2001, pp. 1751-1757).

The third class of methods to reduce the cold temperature properties of a biofuel is to chemically modify the crop oil or biodiesel. A number of inventions are based on modifying the transesterification process that converts free fatty acid oil into biodiesel. The most common approach is to use branched chain alcohols to esterify the crop oil such as isopropanol, isobutanol, and 2-butanol rather than methanol (Lee, I. et al., "Use of Branched-Chain Esters to Reduce the Crystallization Temperature of Biodiesel", Journal of the American Oil Chemists' Society, 72, 1995, 1155-1160). Branched esters have lower freezing points in the neat form and have been shown to improve the cloud point and pour point of biodiesel fuels. For example, isopropyl soyate has a cloud point of −9° C. and 2-butyl soyate has a cloud point of −12° C. In comparison, the cloud point of methyl soyate is 0° C. However, no esterification process has been developed that can achieve the necessary cold flow properties for aviation turbine fuels.

In another variation of this method, the transesterification reaction is carried out in methanol and/or ethanol but with the addition of methyl or ethyl acetates of fatty acids and an inert solvent (U.S. Pat. Publication No. 2003/0167681). This is followed by separation and blending steps to produce a biodiesel with improved properties at low temperatures. However, the freezing point ranged from −10° C. to −17° C.

and is still not an adequate replacement for JP-8 aviation fuel. Detailed specifications for JP-8 can be found in MIL-DTL-83133E.

While all of these inventions offer improvements over untreated crop oil for temperature performance of a biofuel product, none of these methods provides for a biofuel product that meets commercial low temperature requirements. In addition, these methods suffer from inherent disadvantages that limit their economic feasibility in the marketplace.

SUMMARY

The invention described herein provides for a biofuel suitable for use in aviation turbines or biodiesel engines used on land or at sea in a wide range of temperatures, including very low temperatures, and an improved method for production of such a biofuel. The method uses cracking, oil processing, analysis, and separation methods to derive a biofuel with a cloud point of less than $-10°$ C. from plant oils, biologically generated lipids, and/or animal fats.

The invention includes a method for producing a fuel composition derived from biomass that is stable at low temperatures. An oil or oil ester obtained from plant (including algae) or animal biomass is added to a reactor vessel. The oil or oil ester is heated in the reactor to a temperature from about $100°$ C. to about $600°$ C. at a pressure ranging from about vacuum conditions to about 3000 psia for a time sufficient to crack the oil or oil ester. During the process, undesired material, unreacted oil or oil esters, and light ends are removed from the cracked oil or oil ester. Desirable fuel components of the cracked oil or oil ester are separated and collected. The desirable fuel components exhibit low cloud points and generally include C4 to C16 alkanes, alkenes, aromatics, cycloparaffins, or alcohols; C2 to C16 fatty acids; and C2 to C16 fatty acid methyl esters. The collected desirable fuel components are collected and combined to form a fuel composition that has a cloud point of less than $-10°$ C.

The invention also includes a fuel composition having a low temperature cloud point where an oil or oil ester derived from biomass is cracked in a reactor, processed to remove undesirable components, and separated to collect desirable fuel fractions that when combined have a cloud point less than $-10°$ C.

The invention further includes a fuel composition derived solely from plant or animal biomass that contains a hydrocarbon component and a fatty acid component where the fuel composition has a cloud point less than $-10°$ C.

The invention further includes a fuel composition that is a blend of a biofuel derived solely from plant or animal biomass and a petroleum-based fuel where the blended fuel composition has a cloud point less than $-10°$ C.

DETAILED DESCRIPTION

"Biodiesel" means a diesel-equivalent fuel processed from biomass. Biodiesel may be transesterified oil derived from vegetable oil and/or animal fat. The most common commercialized form of biodiesel is produced by the transesterification of a crop oil or animal fat using a hydroxide donor chemical such as methanol or ethanol:

"Biofuel" means any fuel that is derived from plant or animal biomass.

"Biofuel blendstock" is a mixture of chemicals derived from biomass that is mixed with other chemicals into a final fuel product. Preferred fuel mixtures involving a biofuel are mixtures of biofuel blendstock ranging in concentration from 5% to 95% by volume with a geologically transformed fuel.

"Biomass" means any organic, non-fossil material that is derived from the mass of any biological organism excluding mass that has been transformed by geological processes in substances such as coal or petroleum.

"Biojet fuel" means any fuel derived from biomass that meets the cloud point, pour point, and flash point specifications of military JP-8 or commercial Jet A and having acceptable operational properties when utilized as the energy motive force in a turbine.

"Canola methyl ester" is a biodiesel produced by the transesterification of canola oil with methanol.

"Catalyst" means those substances that accelerate the rate or ease of a chemical reaction.

"Catalytic cracking" means a cracking process that uses a catalyst.

"Clouding" means a fuel that has a cloudy appearance due to being below the cloud point.

"Cloud point" means the temperature at which waxy crystals in a fuel separate or form a cloudy appearance. Cloud point is an indicator of the tendency to plug a filter or orifice at a cold operating temperature.

"Cracking" means any process that changes the chemical composition of an organic chemical or chemical mixture by cleaving one or more carbon-carbon bonds in one or more molecules.

"Crop" means any plant and preferably a cereal.

"Cold stable biodiesel" means a biodiesel that has a low cloud point where the mixed fuel exhibits a cloud point less than $-10°$ C., more preferably less than $-20°$ C., and most preferably less than $-30°$ C.

"Diesel" means a fuel made commercially for diesel-powered vehicles.

"Diesel No. 2" means a fuel conforming to the specification requirements for Grade No. 2-D diesel fuel in ASTM D975. When used in other applications, these fuels may be known as No. 2 fuel oil or No. 2-GT gas turbine fuel; these fuel grades having slightly different specifications but comparable compositions.

"Diesel No. 1" means a fuel conforming to the specification requirements for Grade No. 1-D diesel fuel in ASTM D975 and is often commonly referred to as kerosene. In other applications, these fuels may be known as No. 1-GT gas turbine fuel oil or Jet A Aviation Turbine Fuel; these fuel grades having slightly different specifications but comparable compositions.

"Fatty acid" means a carboxylic acid that is saturated or unsaturated which typically contains an aliphatic tail.

"Plant" means any living organism that is a member of the kingdom Plantae or of the division Chlorphyta (green algae).

"Plant oil" means lipids that are derived from plant sources. Examples of plant oil include crop oils or oilseeds and vegetable oils.

"Pour point" means the temperature at which a fuel will no longer flow. Pour point is a measure of the resistance of the fuel to flow at cold temperatures.

"Soy methyl ester" is a biodiesel produced by the transesterification of soybean oil with methanol.

"Thermal cracking" means a cracking process that involves the addition of energy in the form of thermal energy as measured by an increase in the temperature of the substance being cracked.

The present invention is directed to the production of an improved cold stable biofuel derived from plant oils, biologically generated lipids, or animal fats that can be used for a variety of applications as a transportation or stationary fuel or fuel blendstock that can be utilized in very cold temperatures. The cloud points and pour points of the biofuel are preferably less than −10° C., more preferably less than −20° C., and most preferably less than −30° C. This invention resolves problems with current biofuels operating at very cold temperatures through the chemical modification and processing of a crop oil, biologically generated lipids, animal fat, biodiesel or mixture thereof. The chemical modifications, based on cracking and separation techniques, are designed to produce a fuel or fuel blendstock with acceptable combustion and other operating properties for turbine and diesel engines operating at very cold temperatures. Surprisingly, despite the chemical property limitations of current biofuels for high altitude or very cold temperature operations and previous inventions and developments associated with utilizing cracking techniques to manipulate the properties of crop oils or their transesterified derivatives, a method has not been developed for the production of a cold stable biofuel that meets the cold temperature operating requirements of an aviation turbine fuel or diesel engines in low temperature environments.

According to the present invention it has been discovered that an aviation turbine fuel can be produced that satisfies the primary cold flow specifications and combustion properties analogous to JP-8 military or Jet A commercial petroleum-derived aviation turbine fuel. The invention uses thermal or catalytic cracking technologies known to those skilled in the art coupled with separation technologies utilized for fossil fuels such as distillation, filtration, solvent extraction, and related technologies, but the combination of these technologies with selection of lower cloud point properties has not been used for the specific purpose of producing an aviation turbine fuel from crop oil, biologically generated lipids, animal fat oil, or combinations thereof.

The raw material for this new process is any plant oil, biological lipid like algae, animal fat, or a modified material made from biomass sources. Plant oils contain a variety of fatty (naturally synthesized carboxylic) acids which can be purified, separated, and chemically modified for use as a food source or chemical feedstock or as a potential transportation fuel. Plant oils include, but are not limited to, flax, soybean, safflower, sunflower, sesame, canola, rapeseed, jatropha, primrose, poppy, camelina, crambe, olive, coconut, palm, cotton, corn, soybean, and nuts. Typical fatty acids contained in crop oils include saturated and unsaturated fatty acids. Saturated fatty acids do not contain any double bonds or other functional groups. Unsaturated fatty acids contain two or more carbon atoms having a carbon-carbon double bond. Saturated acids include stearic (C18; 18:0), palmitic (C16; 16:0), myristic (C14; 14:0), and lauric (C12; 12:0). Unsaturated acids include those such as linolenic (cis, cis, cis C18; 18:3), linoleic (cis, cis C18; 18:2), oleic (cis C18; 18:1), hexadecanoic (cis, cis C16; 16:2), palmitoleic (cis C16; 16:1), and myristoleic (cis C14; 14:1) (Fangrui, M. et al., "Biodiesel Production: A Review", Bioresource Technology, 70, 1999, 1-15.). Compositions of the major commercially available crop oils are listed in Table 1.

TABLE 1

Typical Plant Oil Compositions

| Crop Name | Lipid % | Polyunsaturated % 18:3 | 18:2 | 22:1 | Mono % 18:1 | Saturated % 18:0 | 16:0 | Total |
|---|---|---|---|---|---|---|---|---|
| Corn | 4 | — | 59 | — | 24 | 17 | — | 17 |
| Crambe | 26-38 | 5 | 9 | 55-60 | 17 | — | — | 3 |
| Flax | 35 | 58 | 14 | — | 19 | 4 | 5 | 9 |
| Soybean | 20 | 7 | 50 | — | 26 | 3 | 12 | 15 |
| Mid-Oleic Soybean | 20 | 0.5 | 28 | — | 60 | 4 | 9 | 13 |
| Safflower | 59 | — | 75 | — | 13 | 12 | — | 12 |
| Sunflower | 47 | — | 74 | — | 23 | 3-4 | 7 | 10-11 |
| NuSun Sunflower | 45-50 | — | 15-35 | — | 50-75 | 3-4 | 4-5 | 7-9 |
| High Oleic Sunflower | 45-50 | — | 7 | — | 83 | 4 | 5 | 9 |
| Primrose | 17 | — | 81 | — | 11 | 2 | 6 | 8 |
| Sesame | 49.1 | — | 45 | — | 42 | 13 | — | 13 |
| Canola | 30-35 | 8 | 22 | 1 | 64 | 3 | 1 | 4 |
| Rapeseed | 30-35 | 8 | 22 | 30-45 | 19 | 4 | 1 | 5 |
| Olive | 20 | — | 8 | — | 75 | 16 | — | 16 |
| Coconut | 35 | — | 3 | — | 6 | — | 91 | 91 |
| Palm | 35 | — | 2 | — | 13 | — | 85 | 85 |
| Camelina | 31 | 31.2 | 23.1 | 2.8 | 16.8 | 3.0 | 7.8 | 10.8 |

It is known that biodiesel derived from plant biomass using esterified soybean oil or soy methyl ester, referred to as "SME," can be utilized as an aviation fuel only at low altitude conditions (Corporan, E. et al., "Impacts of Biodiesel on Pollutant Emissions of a JP-8-Fueled Turbine Engine". J. Air & Waste Manage Assoc, 55, 1995, 940-949). Also, biodiesel derived from many different crop oils or animal fats has also been shown to be an acceptable diesel #2 fuel replacement. Diesel #2 is a petroleum based product that has acceptable properties at temperatures above 0° F. (−18° C.). However, biodiesel, including the most common biodiesel using "methyl esters," exhibits cold flow property problems below 32° F. (0° C.).

In another variation used to produce biodiesel, a transesterification reaction was carried out with methanol and/or ethanol but with the addition of methyl or ethyl acetates of fatty acids and an inert solvent (U.S. Patent Publication No. 2003/0167681). However, the low temperature properties of this biofuel are not adequate to qualify as a commercial replacement for JP-8 or Jet A aviation fuel.

Figure 1:
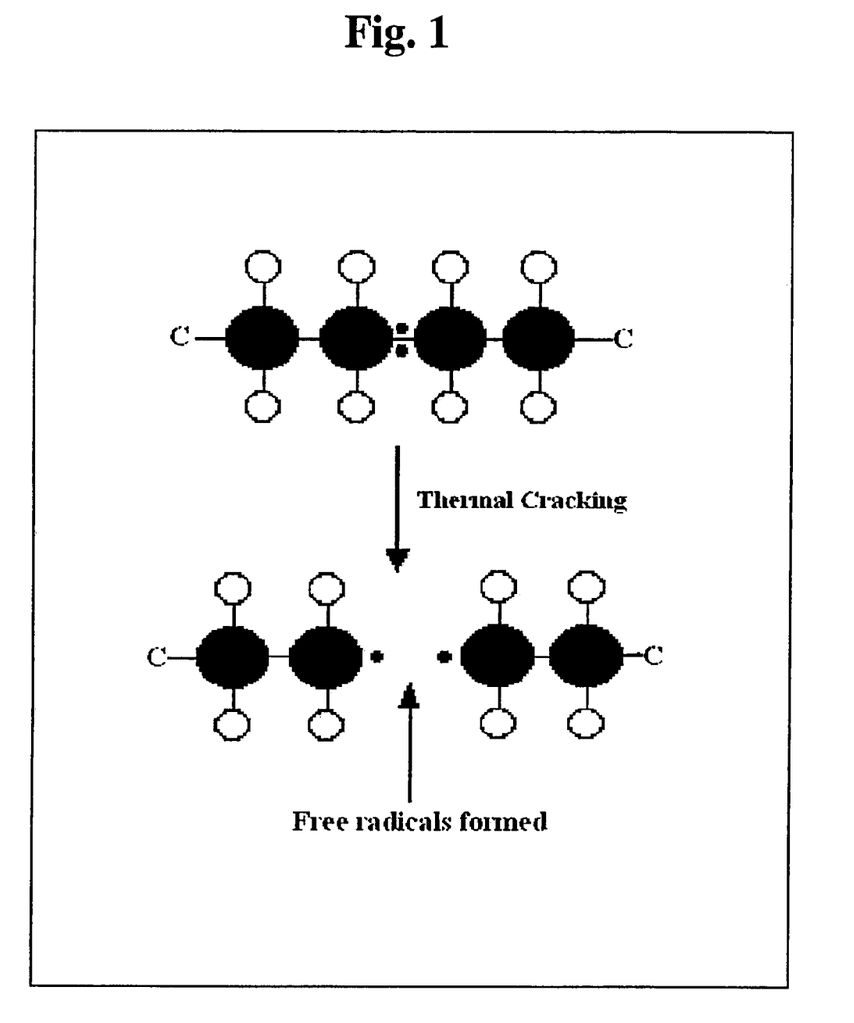
FIG. 1 is a diagram illustrating formation of free radicals from a single molecule.

The current invention utilizes thermal or catalytic cracking methods coupled with separation technologies and chemical analysis to produce crop oil-, biologically generated lipid-, or animal fat-based fuels that can be utilized at high altitude conditions and/or very cold temperatures. In the cracking process, energy is used to break carbon-carbon bonds. Each carbon atom ends up with a single electron and free radicals are formed as shown in FIG. 1. Any reactions of the free radicals can lead to various products. The breaking of large organic molecules into smaller, and more useful molecules, can be achieved by using high pressures and/or temperatures with a catalyst (catalytic cracking) or without (thermal cracking). Previous research has shown that crop oils and biodiesel are compatible for the cracking processes, using either thermal or catalytic cracking (Ooi, Y. et al., "Catalytic Conversion of Palm Oil-Base Fatty Acid Mixtures to Liquid Fuel", Biomass & Bioenergy, 27, 2004, 477-484; Katikaneni, S. et al., "Catalytic Conversion of Canola Oil to Fuels and Chemicals Over Various Cracking Catalysts", Canadian J. Chem Eng, 73, 1995, 484-497). These techniques have been used in previous inventions and studies to modify the chemical composition of crop oils or biodiesel; however, they have not been used to produce a biofuel that operates acceptably at very cold temperatures.

Figure 2:
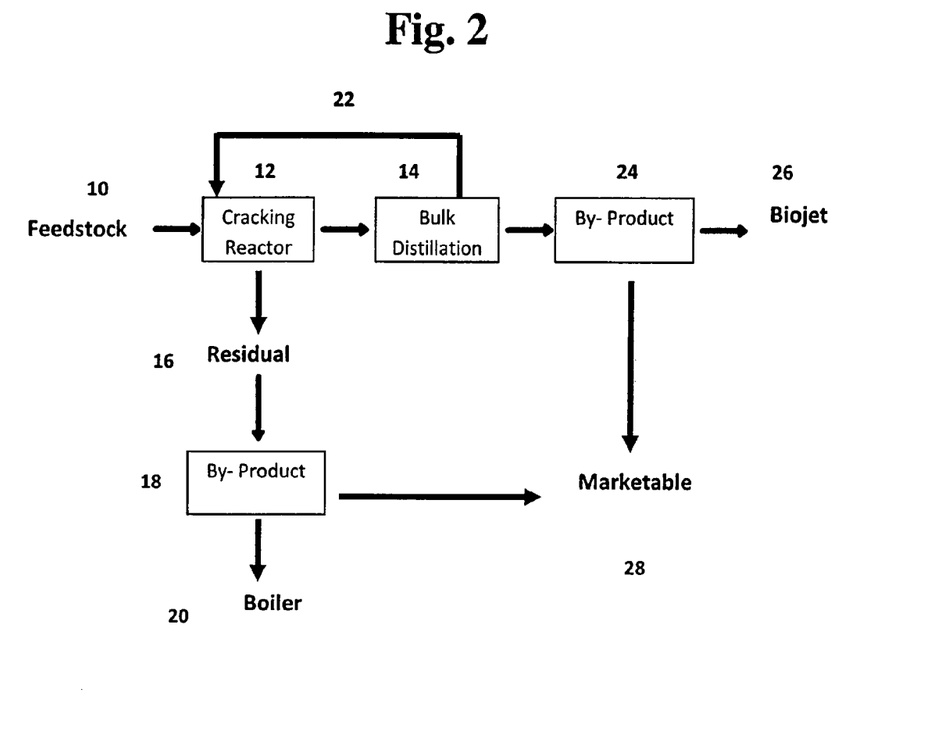
FIG. 2 is a simplified block flow diagram of a biojet fuel process.

A simplified block diagram of the biofuel production process of the current invention is shown in FIG. 2. The crop oil, lipid, or animal fat feedstock, 10, is produced by processes now available or that may be invented in the future. This raw feedstock may be preheated or directly fed into the cracking reactor, 12. By varying the time, temperature, and pressure under which a particular feedstock remains under cracking conditions, the desired degree of cracking (conversion) can be controlled. Temperature and time (residence time) are the more important process variables with pressure playing a secondary role. The products of the cracking process are dependent upon the conditions of cracking and the original composition of the feedstock oil (Bhaskar, B. K., "Modern Petroleum Refining Process", Oxford and IBH publishing Co. Pvt. Ltd., 303-405) and the gaseous environment present in the cracking reactor. The cracking conditions are varied based on detailed chemical analysis and evaluation of the low temperature stability of the feedstock and cracking products in order to produce an acceptable biojet fuel. The presence of a catalyst can be used to improve the yield of desirable products, decrease the formation of unwanted products, or increase the efficiency of the cracking reaction due to lower pressure, temperature, or residence time requirements. Catalysts include but are not limited to zeolytes and rare metals such as palladium, niobium, molybdenum, platinum, titanium, aluminum, cobalt, gold and mixtures thereof.

In modified cracking applications, a diesel fuel additive is produced with favorable combustion properties as measured by the cetane number from crop oils using cracking in the presence of hydrogen, known as hydrocracking (U.S. Pat. No. 4,992,605). Another related invention utilizes hydrocracking to obtain a similar additive from tall oil or tall oil/crop oil blends (U.S. Pat. No. 5,705,722). In yet another version of this technique, biodiesel is subjected to catalytic cracking and then blended with diesel fuel as an additive to provide improved fuel properties (U.S. Pat. No. 5,578,090). Any of these modified cracking applications could be used as a cracking method in the present invention.

While all of these many inventions are improvements over the pure crop oil or biodiesel for performance at lower temperatures, each method has inherent disadvantages that limit the feasibility of the method for the large-scale production of an aviation jet fuel from crop oil or biodiesel either because the method does not render a product that meets the cloud point and pour point requirements equivalent to JP-8 or Jet A specifications or, alternatively, the cost of production is unfavorable. Thus, there is a need to develop a method that allows a crop oil, biologically generated lipid, or animal fat oil feedstock to be converted into a product that will function effectively as turbine and/or diesel engine fuel or fuel blendstock and which also meets the cold flow property requirements of aviation fuel. The current invention utilizes separation technologies coupled with thermal/catalytic cracking techniques in order to develop crop oil-, biologically generated lipid-, or animal fat-based fuels that can be utilized at high altitude conditions and very cold temperatures.

In FIG. 2, the cracking output is subjected to a variety of processing steps, 14, dependent upon the material generated. The output from the cracking reactor depends upon the specific reactor design employed. The following are examples of reactor types known to those skilled in the art: batch, continuous flow through, flow through packed bed, and fluidized bed. Material generated in the cracking reactor consists of four general classes: light ends, biojet fuel chemical components 26, unreacted raw materials, and residual materials or residue 16.

The light ends consist of the unreacted vapor-phase material that was added to the reactor to manipulate the cracking reaction, such as hydrogen, nitrogen, or water vapor, plus small molecular weight organic chemicals and hydrocarbons generated in the cracking reactor. The small molecular weight organic chemicals and hydrocarbons, such as methane, methanol, ethane, ethanol, n-pentane, i-pentane, pentene, pentanol n-butane, i-butane, butanol, butane, methyl ester, ethyl ester, etc., have chemical and physical properties (such as being too volatile) that are undesirable when present in substantial concentrations in an aviation turbine or cold flow diesel fuel. Light ends are separated from the other material that exits the reactor by gas-liquid phase separation, distillation, condensation, or other processes 24.

The biojet fuel chemical components 26 are those portions of the material generated in the cracking reactor that contribute to desirable chemical and physical properties of the biojet fuel. For example, jet and diesel fossil fuels such as those that meet the fuel specifications for JP-8 are primarily composed of C6 to C12 straight or branched chain alkane hydrocarbons or aromatic hydrocarbons, where "C" refers to carbon and the number—6 or 12—refers to the number of carbon atoms in the molecule. Typical desirable compounds generated in the cracking reactor include C4 to C16 alkanes, alkenes, aromatics, cycloparaffins, and alcohols; C2 to C16 fatty acids; and C2 to C16 fatty acid methyl esters. Biofuel fractions selected preferably consist of C4 to C12 alkanes, alkenes, aromatics, cycloparaffins, and alcohols; C2 to C12 fatty acids; and C2 to C12 fatty acid methyl esters and more preferably consist of C4 to C8 alkanes, alkenes, aromatics, cycloparaffins, and alcohols; C2 to C8 fatty acids; and C2 to C8 fatty acid methyl esters.

Unreacted raw materials are chemicals that enter the cracking reactor but, for some reason, do not transform to chemical compounds with carbon chains shorter than C16. These materials have some chemical and physical properties that are undesirable in an aviation turbine or cold flow diesel fuel. Unreacted raw materials are separated from the biojet fuel chemical components by distillation or other separation techniques 14. These unreacted or uncracked raw materials 22 can then be returned to the cracking reactor, fed to a second cracking reactor or utilized for some other purpose.

Residual material or residue 16 consists of chemicals produced during cracking reactions that have a higher molecular weight and/or lower volatility and/or lower heating value than is desirable for the biojet fuel product. Some of the residual components can be separated from the biojet fuel chemical components along with the unreacted raw materials and processed with these unreacted raw materials. Other residue components, typically those of higher molecular weight, will be in the form of solid material after the cracking reaction. These compounds are typically known as "coke." The coke may contain valuable chemical compounds, such as boiler fuel 20 or other by-products 28 that can be extracted from the residue by various process methods 18 including solvent extraction, distillation, etc. Depending upon the design of the cracking reactor, the coke may not be amenable to further processing. This coke may be oxidized or combusted or otherwise removed from the cracking reactor or cracking catalysts by methods known to those skilled in the art.

In an exemplary embodiment of the invention, a free fatty acid crop oil, biologically generated lipids, or animal fat oil or its transesterified derivative is heated to a temperature ranging from 300° C. to 500° C., in a vessel, known as the cracking reactor, at pressures ranging from vacuum conditions to 3000 psia, in the presence of a gaseous environment that may contain an inert gas such as nitrogen, water vapor, hydrogen, a mixture of vapor-phase organic chemicals or any other gaseous substance, and at residence times ranging from one to 180 minutes to affect cracking reactions that change the chemical composition of the contents of the cracking reactor. The vapor leaving the cracking reactor 12, known as the crackate, is subjected to downstream processing that may include cooling and partial condensation, vapor/liquid separation, extraction of by-product chemicals by solvent extraction or other chemical/physical property manipulation, in-situ reaction, distillation or flash separation to produce an acceptable aviation turbine fuel. The liquid and solids leaving the reactor 12, known as the residue, are subjected to downstream processing that may include cooling or heating, liquid/solid separation, vapor/liquid separation, vapor/solid separation, extraction of by-product chemicals by solvent extraction or other chemical/physical property manipulation to produce an acceptable fuel by-product or byproducts. Unreacted and partially reacted material separated from either the crackate or the residue may be recycled to the cracking reactor 12 or routed to additional cracking reactors.

EXAMPLE 1

Biofuel Compositions from Canola Methyl Ester

A one gallon lab-scale batch cracking reactor system was used as a cracking reactor. Output from the cracking reactor, known as crackate was then processed further. The light hydrocarbons were removed through a depressurization step after condensation of liquids at atmospheric pressure and a lab-scale distillation apparatus was used as a single step separator for the condensed liquids. From this equipment was produced an aviation-quality fuel from canola methyl ester, a type of biodiesel. These experiments were performed using the thermal cracking technique under both vacuum conditions and in the presence of a 500 psig hydrogen atmosphere. Table 2, columns 1 and 2 show typical chemical compositions obtained from the cracking and processing of canola methyl ester under vacuum and hydrogen pressure, respectively. Typical cloud points and pour points of the fuels produced are shown in Table 3. Remarkably, both the cloud points and pour points of the canola biodiesel subjected to thermal cracking, both under vacuum conditions and in the presence of hydrogen and pressure, was significantly less than −30° C. In contrast, the cloud point and pour point for starting canola methyl ester feedstock was 1° C. and −9° C., respectively. These data demonstrate that the new method can be used to develop aviation biofuel and biodiesel for engines operating at high altitudes and/or in very cold climates.

TABLE 2

Biofuel Compositions from Soybean and Canola Raw Materials

| Type | CME[1] Vac | CME[2] $H_2$ | SME[3] $H_2$ | CanOil[4] Vac | CanOil[5] $H_2$ | SoyOil[6] $H_2$ |
|---|---|---|---|---|---|---|
| Total Alkanes | 17.5 | 23.5 | 15.4 | 25.1 | 22 | 16.7 |
| Total Alkenes | 0 | 0 | 0.4 | 0 | 0 | 0 |
| Sat. FAMEs[2] | 54.4 | 50.6 | 44.3 | — | | |
| Sat FA | — | — | — | 37.7 | 29.5 | 60.3 |
| Total BTX | 2.1 | 2.4 | 2.8 | 1.8 | 1.8 | 0.6 |
| Unknowns | 26.0 | 23.5 | 37.1 | 35.4 | 46.7 | 22.4 |
| Total | 100.0 | 100.0 | 100.0 | 100.0 | 100.0 | 100.0 |

Total Alkanes: $C_7$-$C_{18}$;
Total Alkenes: $C_9$-$C_{15}$;
Saturated FAMEs: Fatty acid methyl esters $C_4$-$C_{22}$;
Sat. FA: Saturated fatty acid $C_4$-$C_{12}$;
BTX: Benzene, toluenes, xylenes, and ethylbenzene
[1] Canola methyl ester cracked under vacuum conditions
[2] Canola methyl ester cracked under 500 psig hydrogen pressure
[3] Soy methyl ester cracked under 500 psig hydrogen pressure
[4] Canola oil cracked under vacuum conditions
[5] Canola oil cracked under 500 psig hydrogen pressure
[6] Soybean oil cracked under 500 psig hydrogen pressure

TABLE 3

Comparison of Cold Flow Properties for Biojet Fuel to Jet Fuel, Crop Oil, and Biodiesel

| Substance | Cloud Point (° C.) ASTM D2500 | Pour Point (° C.) ASTM D97 | Flash Point (° C.) ASTM D93 | Heating Value (MJ/kg) |
|---|---|---|---|---|
| Petroleum JP-8 [1] | −48 | −53 | 46 | 40.93 |
| Virgin Soybean Oil | −4 | −12 | 218 | 39.63* |
| Cracked soybean oil - $H_2$ | −19 | −24 | NA | 40.2 |
| Soy oil derived biojet fuel | −39 | −61 | 72 | 40.49 |
| Soy methyl ester biodiesel (SME) | 0 | −2 | 179 | 39.8** |
| Cracked SME - $H_2$ | −20 | −25 | NA | 36.91 |
| SME derived biojet fuel | −43 | −61 | 72 | 36.05 |
| Virgin Canola Oil | 1 | −9 | 280 | 39.73* |
| Cracked canola oil - vacuum | −10 | −18 | NA | 37.06 |
| Can Oil Vac cracked derived biojet fuel | −41 | −61 | 55 | 37.9 |
| Cracked canola oil - $H_2$ | −2 | −10 | NA | 37.12 |
| Can Oil H2 cracked derived biojet fuel | −42 | −63 | 52 | 38.1 |
| Canola methyl ester biodiesel (CME) | 1 | −9 | 163 | 40.45** |
| Cracked CME - vacuum | −21 | −26 | NA | 35.25 |
| CME vac cracked derived biojet fuel | −43 | −60 | 53 | 37.9 |
| Cracked CME - $H_2$ | −18 | −20 | NA | 36.48 |
| CME $H_2$ cracked derived biojet fuel | −37 | −62 | 65 | 35.29 |

[1] Meassured
*Energy Conversion and Management, Vol. 41, pp. 1609, 2000
**JAOC, Vol. 68, No. 1, 1991

Figure 3:
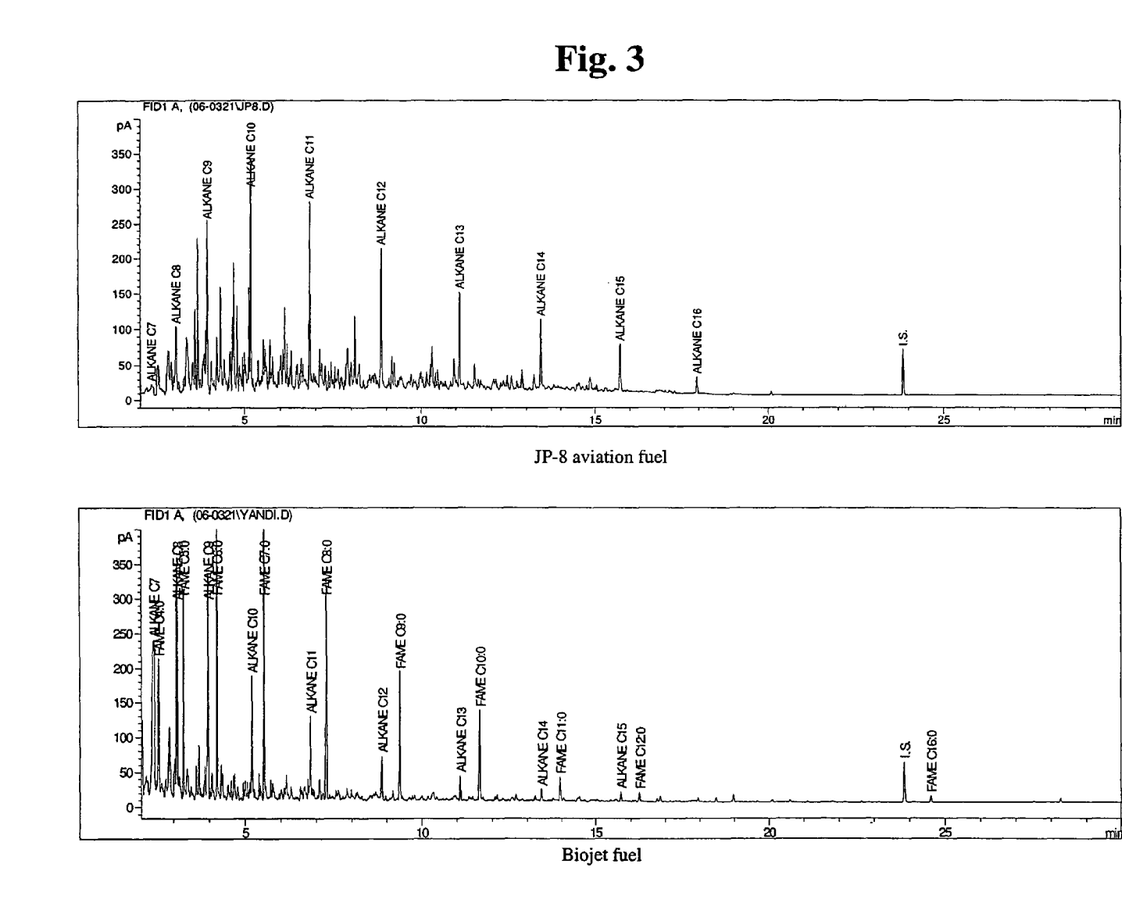
FIG. 3 shows a gas chromatographic comparison of JP-8 aviation fuel and biojet fuel produced from canola methyl ester.

FIG. 3 shows a comparison of gas chromatograph flame ionization detector analysis for JP-8 and biojet fuel produced from canola methyl ester. The analyses of the processed canola methyl ester show that it has a chemical composition similar to that of JP-8 petroleum-based aviation fuel with the exception that the processed canola methyl ester composition is primarily a combination of short chain methyl ester compounds and alkanes whereas the JP-8 composition was essentially all alkanes. The chromatograms illustrate that both fuels contain unidentified organic chemicals at very low concentrations that do not materially affect the ability of the fluid to function as a fuel.

EXAMPLE 2

Bio Fuel Compositions from Soy Methyl Ester

The apparatus described in example 1 was used to produce an aviation-quality fuel from soy methyl ester, a type of biodiesel. Table 2, column 3 shows a typical chemical composition obtained from the cracking and processing of soy methyl ester under hydrogen pressure. Similar to canola methyl ester, the cloud point and pour point of the processed soybean biodiesel was less than −30° C. as shown in Table 3.

EXAMPLE 3

Biofuel Compositions from Canola Oil under Vacuum and Hydrogen Pressure Cracking Conditions The apparatus described in example 1 was used to produce an aviation-quality fuel from canola oil. Table 2, columns 4 and 5 show typical chemical compositions directly obtained from the cracking and processing of canola oil under vacuum and hydrogen pressure, respectively. Typical cloud point and pour point of the fuels produced are shown in Table 3.

EXAMPLE 4

Biofuel Compositions from Soybean Oil

The apparatus described in example 1 was used to produce an aviation-quality fuel from soybean oil. Table 2, column 6 shows a typical chemical composition obtained from the cracking and processing of soybean oil. Typical cloud point and pour point of the fuel produced are shown in Table 3.

These results clearly demonstrate that aviation and cold temperature fuels having cloud points and pour points than less −10° C. can be produced from different crop species using the method of invention described herein.

Other Embodiments

The description of the specific embodiments of the invention is presented for the purpose of illustration. It is not intended to be exhaustive nor to limit the scope of the invention to the specific forms described herein. Although the invention has been described with reference to several embodiments, it will be understood by one of ordinary skill in the art that various modifications can be made without departing from the spirit and the scope of the invention, as set forth in the claims. All patents, patent applications and publications referenced herein are hereby incorporated by reference.

Other embodiments are within the claims. Although the present invention has been described with reference to preferred embodiments, workers skilled in the art will recognize that changes may be made in form and detail without departing from the spirit and scope of the invention.

The invention claimed is:

1. A method for producing a fuel composition that is stable at low temperatures, wherein the fuel composition is derived from biomass comprising the steps of:
   (a) adding an oil or oil ester, wherein the oil or oil ester is obtained from plant, biological lipid, or animal biomass, into a reactor vessel;
   (b) heating the oil or oil ester in the reactor vessel in an absence of externally added hydrogen to a temperature ranging from about 100° C. to about 600° C. at a pressure ranging from about vacuum conditions to about 3000 psia for a time sufficient to crack the oil or oil ester;
   (c) removing undesired material, unreacted oil or oil ester, and light ends from the cracked oil or oil ester;
   (d) separating the cracked oil or oil ester and collecting fractions of the cracked oil or oil ester including at least one fraction selected from the group consisting of $C_4$ to $C_{16}$ alkanes, $C_4$ to $C_{16}$ alkenes, $C_4$ to $C_{16}$ aromatics, $C_4$ to $C_{16}$ cycloparaffins, $C_4$ to $C_{16}$ alcohols, $C_2$ to $C_{16}$ fatty acids, $C_2$ to $C_{16}$ fatty acid methyl esters and combinations thereof; and
   (e) combining the collected fractions of cracked oil or oil ester to produce a fuel composition having a cloud point less than −10° C.

2. The method of claim 1, wherein the cloud point of the fuel composition is less than −20° C.

3. The method of claim 2, wherein the cloud point of the fuel composition is less than −30° C.

4. The method of claim 1, wherein the pour point of the fuel composition is less than −40° C.

5. The method of claim 1, wherein the oil or oil ester is a crop oil selected from a group consisting of soybean oil, canola oil, palm oil, sunflower oil, corn oil, flax seed oil, jatropha oil, cottonseed oil, safflower oil, crambe oil, evening primrose oil, sesame oil, rapeseed oil, olive oil, coconut oil, camelina, and combinations thereof.

6. The method of claim 1, wherein the oil or oil ester is a biodiesel generated through transesterification of crop oil, biological lipid, animal fat oil, or any combination or mixture thereof.

7. The method of claim 1, wherein the temperature in the reactor vessel is between 300° C. and 500° C.

8. The method of claim 1, wherein the oil or oil ester is heated in the reactor vessel for a time ranging from one to 180 minutes.

9. The method of claim 1, wherein heating in the reactor vessel occurs in a gaseous environment wherein the gaseous environment includes at least one of an inert gas, nitrogen, water vapor, or a mixture of vapor-phase organic chemicals.

10. The method of claim 1, wherein a catalyst is added to the reactor vessel.

11. The method of claim 10, wherein the catalyst improves yield of collected fractions;
   decreases formation of undesired material, unreacted oil or light ends; or increases cracking efficiency.

12. The method of claim 1, wherein the reactor vessel is of a type selected from a group consisting of batch, continuous flow through, flow through packed bed, and fluidized bed.

13. The method of claim 1, wherein separating and collecting fractions of the cracked oil or oil ester includes chemical analysis.

14. The method of claim 1, wherein the oil or oil ester fractions separated and collected include at least one of $C_4$ to $C_{12}$ alkanes, alkenes, aromatics, cycloparaffins, or alcohols; $C_2$ to $C_{12}$ fatty acids; and $C_2$ to $C_{12}$ fatty acid methyl esters.

15. The method of claim 14, wherein the oil or oil ester fractions separated and collected include at least one of $C_4$ to $C_8$ alkanes, alkenes, aromatics, cycloparaffins, or alcohols; $C_2$ to $C_8$ fatty acids; and $C_2$ to $C_8$ fatty acid methyl esters.

16. The method of claim 1, further comprising blending the fuel composition with petroleum-based turbine fuel selected from a group consisting of Jet A, JP-4, JP-5, JP-8 and combinations thereof in ratios ranging from greater than 0% to less than 100% petroleum-based turbine fuel to produce a turbine fuel blendstock.

17. The method of claim 1, wherein the fuel composition has acceptable combustion properties and cold temperature properties for a diesel engine and is equivalent to a standard diesel #1 transportation fuel.

18. The method of claim 1, further comprising blending the fuel composition with standard diesel #1, diesel #2 or a combination thereof petroleum-based diesel fuel in ratios ranging from greater than 0% to less than 100% petroleum-based diesel fuel to produce a diesel engine fuel blendstock.

19. A fuel composition having a low temperature cloud point, formed by a process in which an oil or oil ester derived from biomass is cracked in a reactor vessel in an absence of externally added hydrogen; processed to remove residual material, unreacted oil and light ends; and separated to collect fuel fractions, which when combined, have a cloud point less than −10° C.

20. A fuel composition comprising:
(a) a biofuel composition derived solely from plant or animal biomass by cracking the plant or animal biomass in an absence of externally added hydrogen and having a cloud point of less than −10° C., and including:
  (1) a hydrocarbon component consisting essentially of $C_4$ to $C_{16}$ alkanes, alkenes, aromatics, cycloparaffins, and alcohols; and
  (2) a fatty acid component consisting essentially of at least one of $C_2$ to $C_{16}$ fatty acids and $C_2$ to $C_{16}$ fatty acid methyl esters.

21. The fuel composition of claim 20, wherein the fuel composition has a cloud point of less than −20° C.

22. The fuel composition of claim 20, wherein the fuel composition has a cloud point of less than −30° C.

23. The fuel composition of claim 20, wherein the fuel composition has a pour point of less than −40° C.

24. The fuel composition of claim 20, wherein the hydrocarbon component and the fatty acid component together constitute at least 50% by volume of known identified chemical compounds in the fuel composition.

25. The fuel composition of claim 20, further comprising:
(b) petroleum-based turbine fuel selected from a group consisting of Jet A, JP-4, JP-5, JP-8 and combinations thereof in ratios ranging from greater than 0% to less than 100% petroleum-based turbine fuel;
wherein the fuel composition is a turbine fuel blendstock.

26. The fuel composition of claim 20, further comprising:
(b) standard diesel #1, diesel #2 or a combination thereof petroleum-based diesel fuel in ratios ranging from greater than 5% to less than 95% petroleum-based diesel fuel;
wherein the fuel composition is a diesel engine fuel blendstock.

27. The method of claim 1, wherein the oil or oil ester is heated in the reactor vessel in the absence of a catalyst.

28. The method of claim 1, wherein the fuel composition contains between about 15% by weight and about 25% by weight $C_7$ to $C_{18}$ alkanes.

29. The method of claim 28, wherein the fuel composition contains between about 44% by weight and about 54% by weight $C_4$ to $C_{22}$ saturated fatty acid methyl esters.

30. The method of claim 29, wherein the ratio of $C_7$ to $C_{18}$ alkanes to $C_4$ to $C_{22}$ saturated fatty acid methyl esters is between about 2:7 and about 4:7.

31. The method of claim 28, wherein the fuel composition contains between about 29% by weight and about 60% by weight $C_4$ to $C_{12}$ saturated fatty acids.

32. The method of claim 31, wherein the ratio of $C_7$ to $C_{18}$ alkanes to $C_4$ to $C_{12}$ saturated fatty acids is between about 1:4 and about 6:7.

* * * * *